United States Patent Office 3,509,650
Patented May 5, 1970

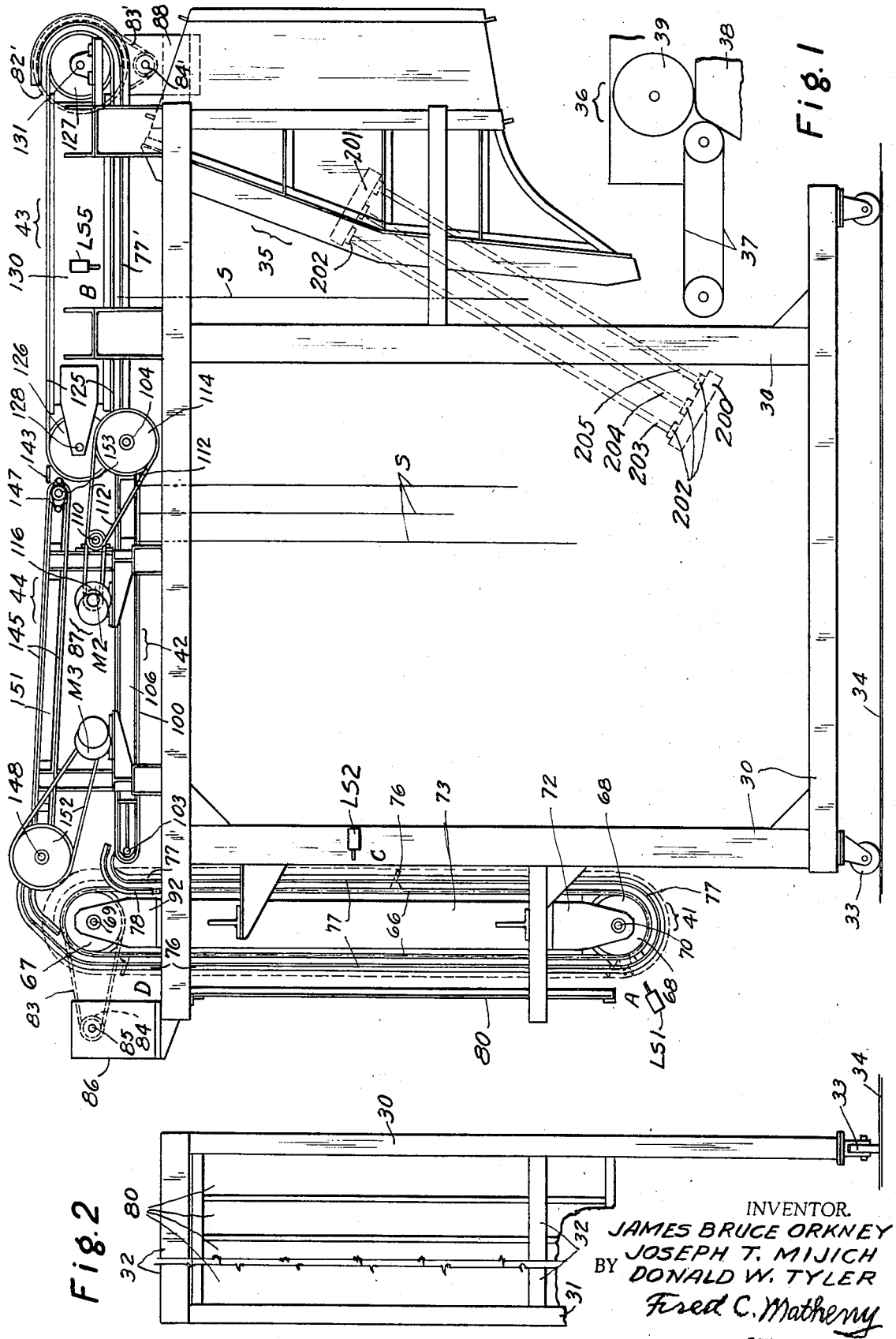

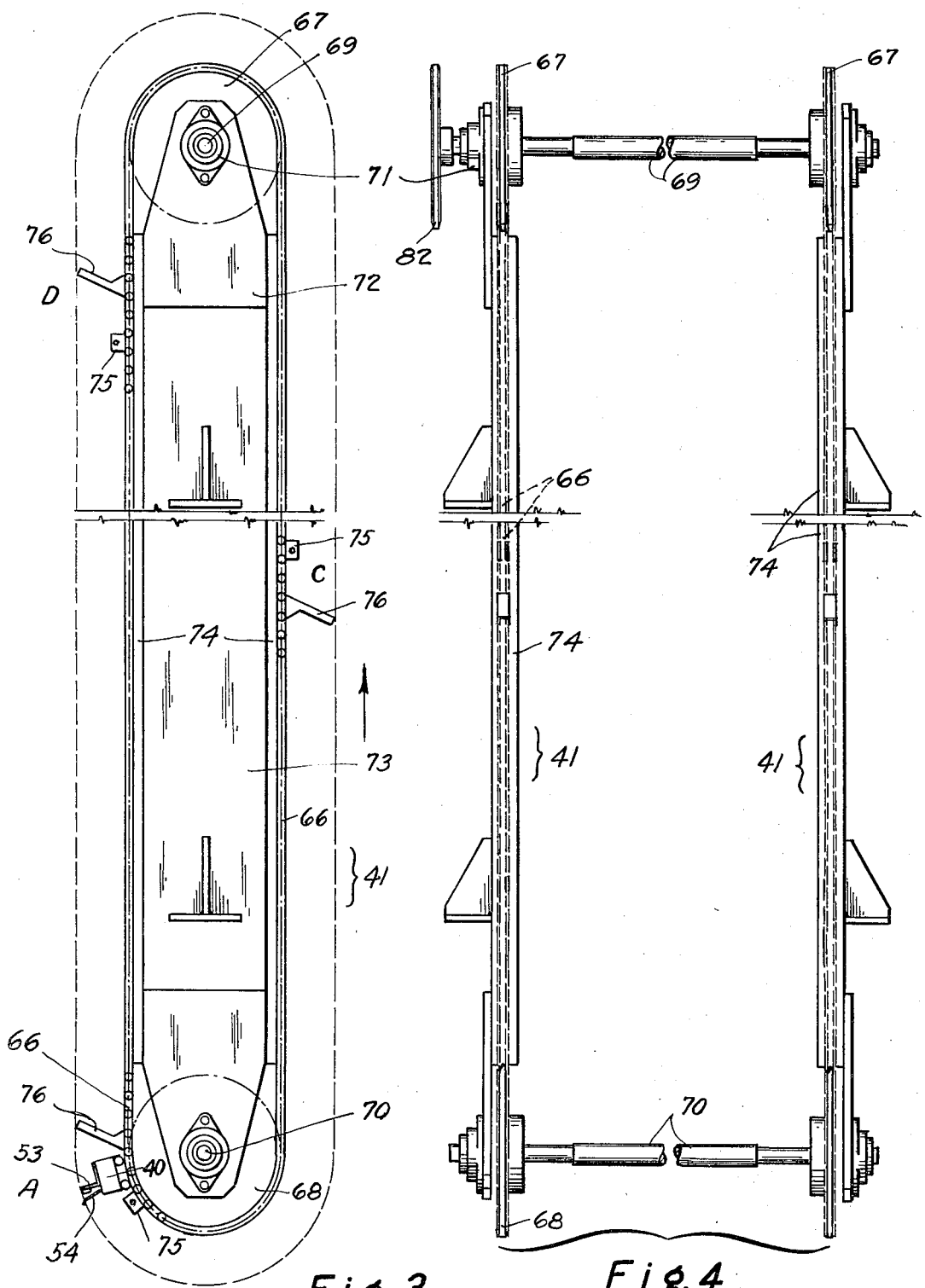

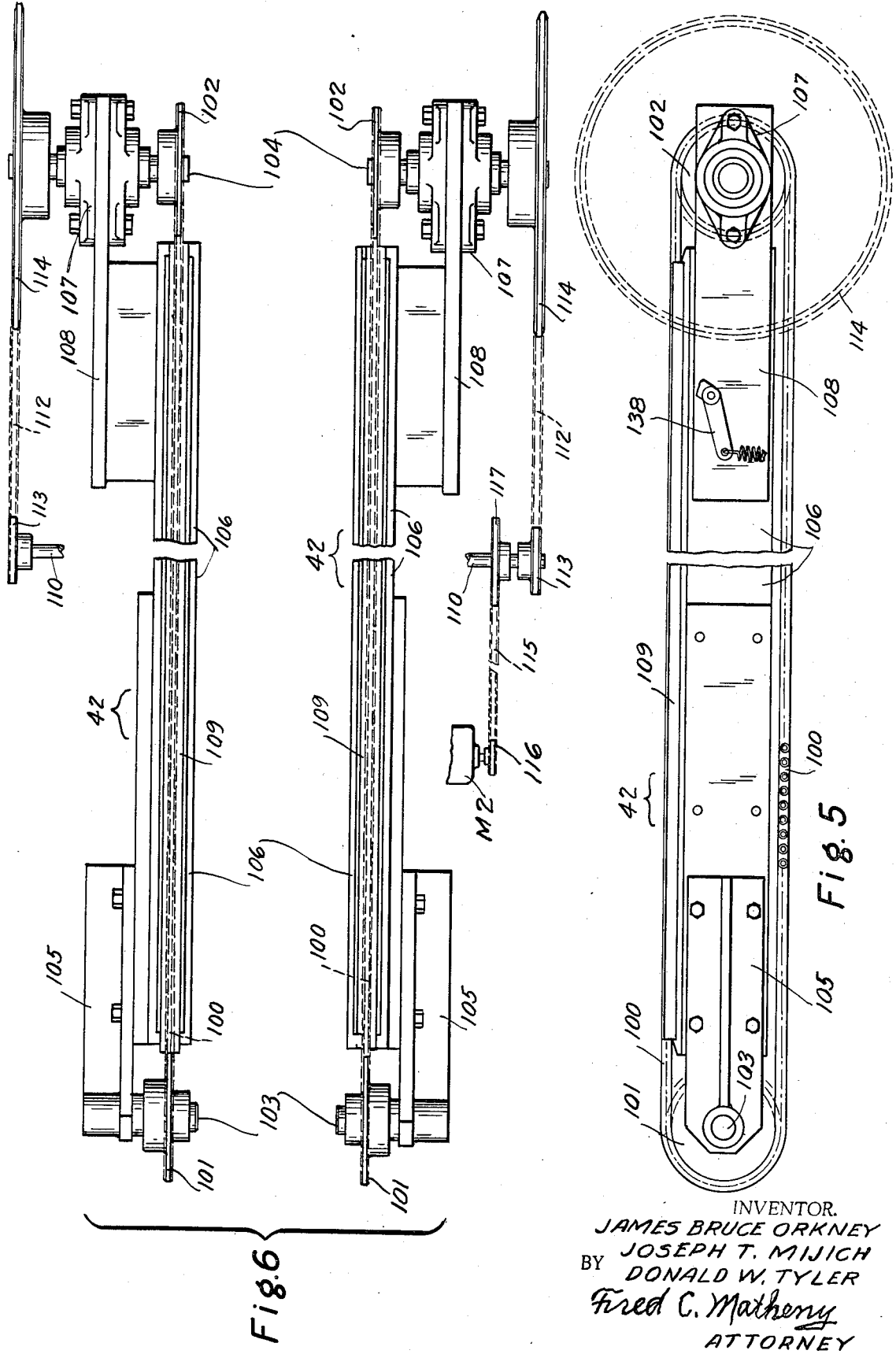

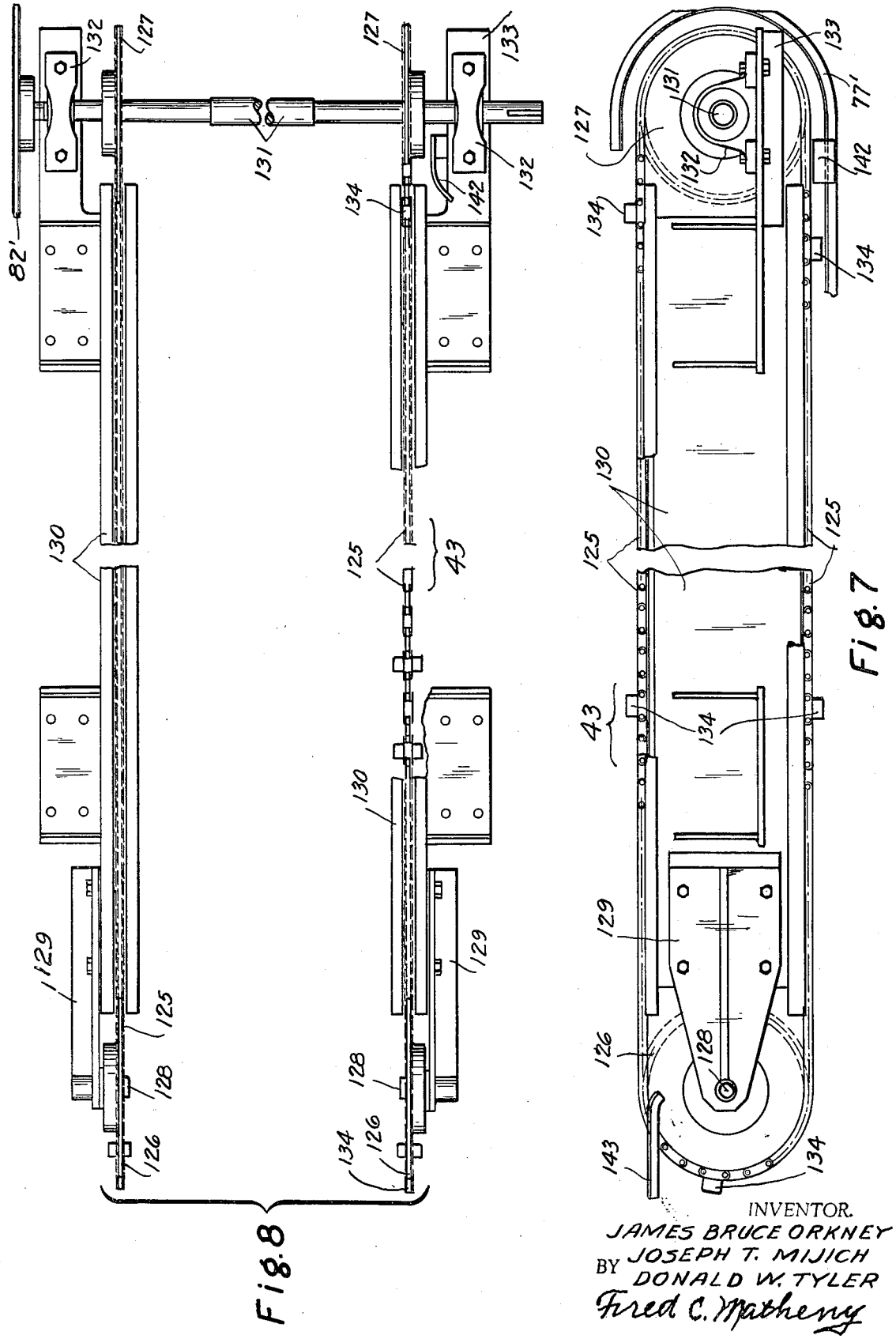

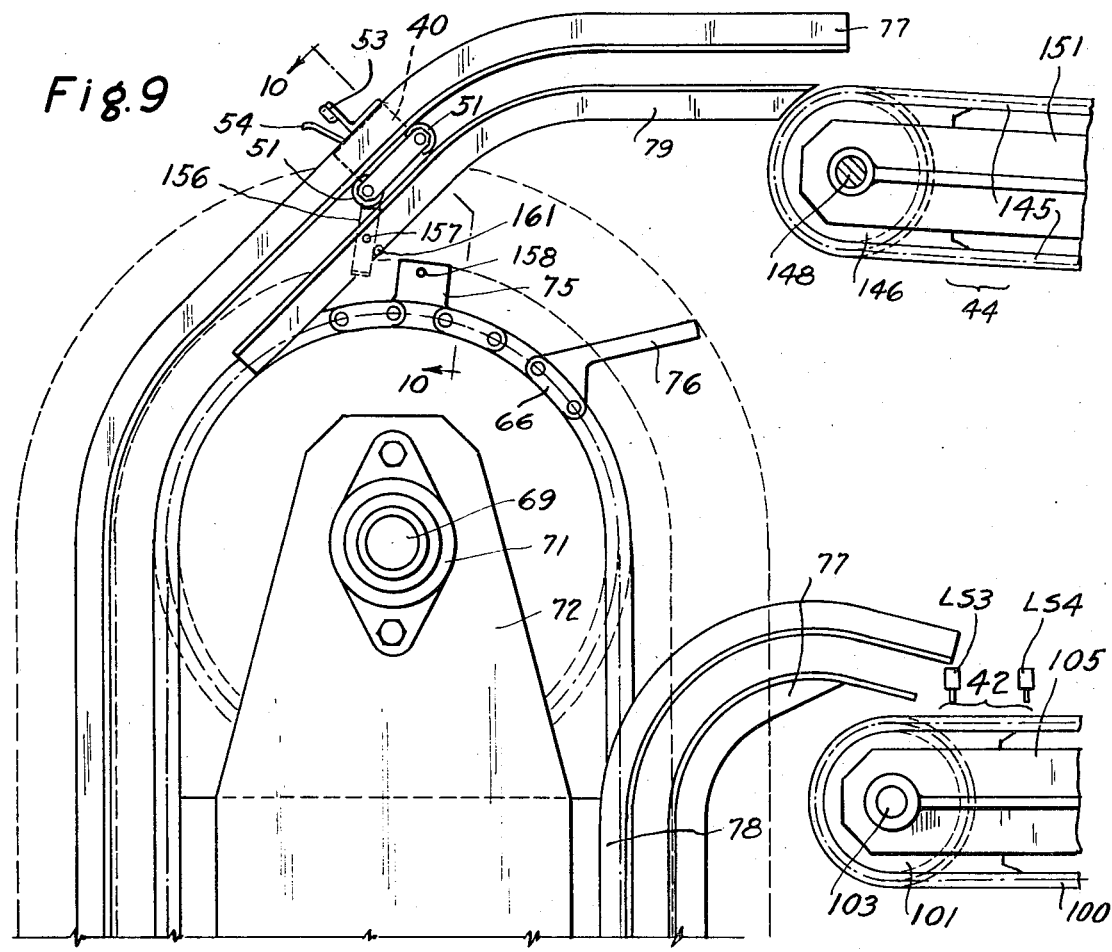
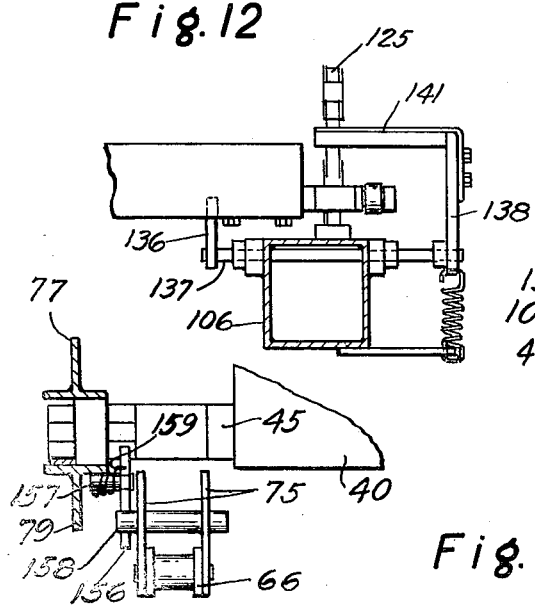
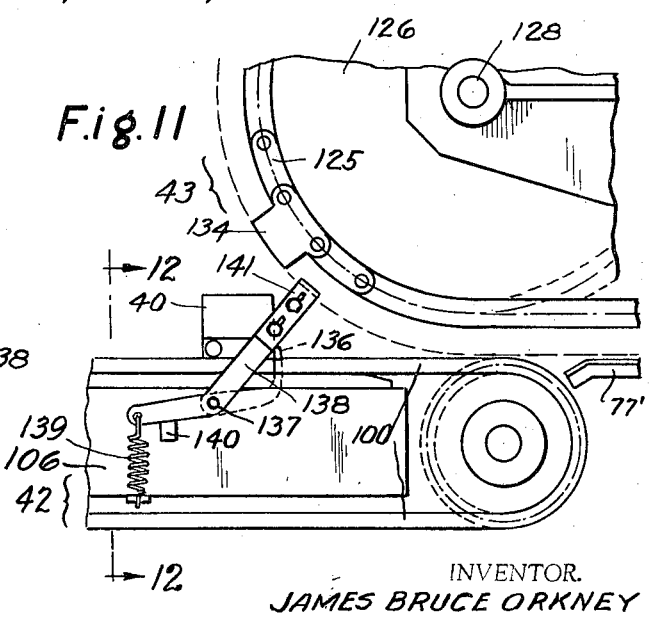

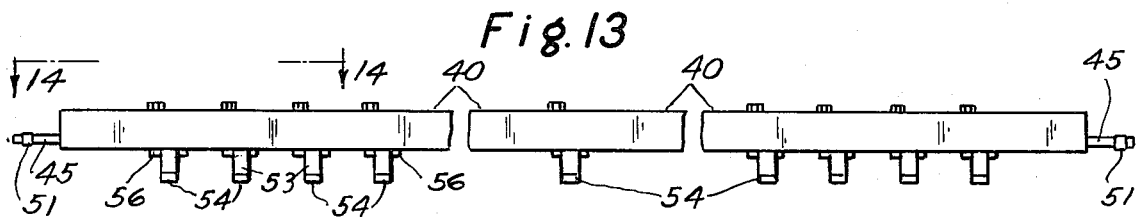
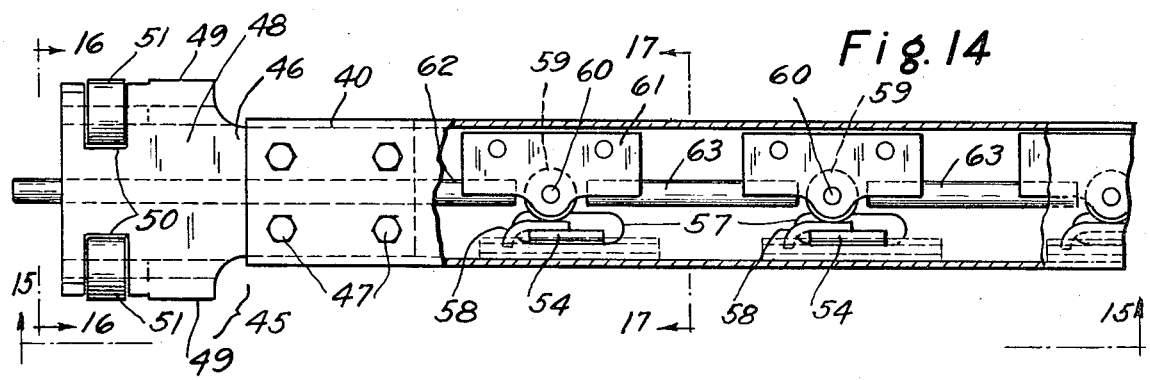
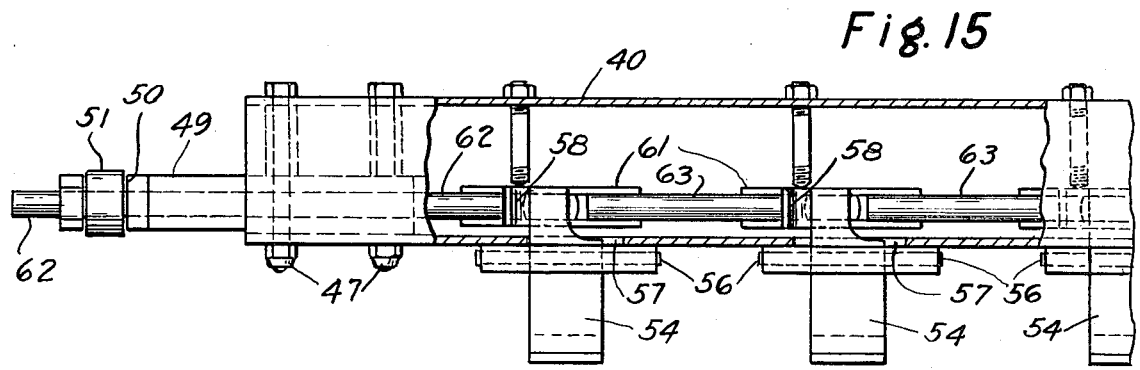
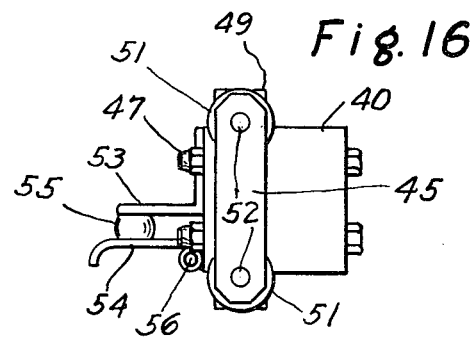
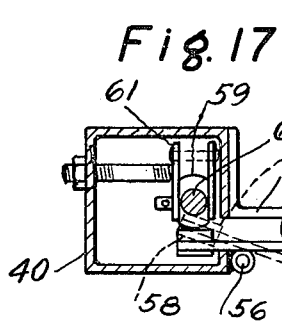
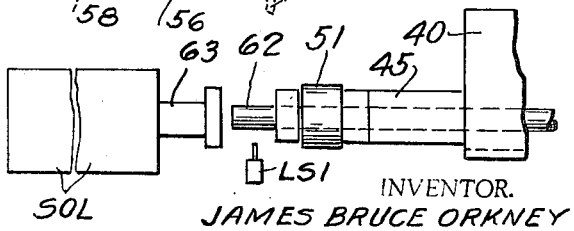
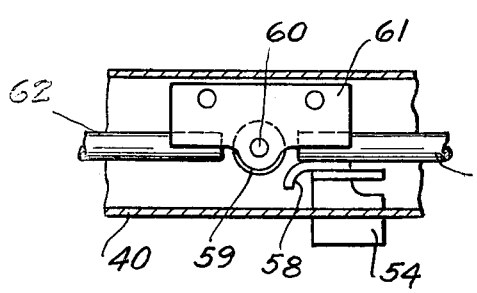

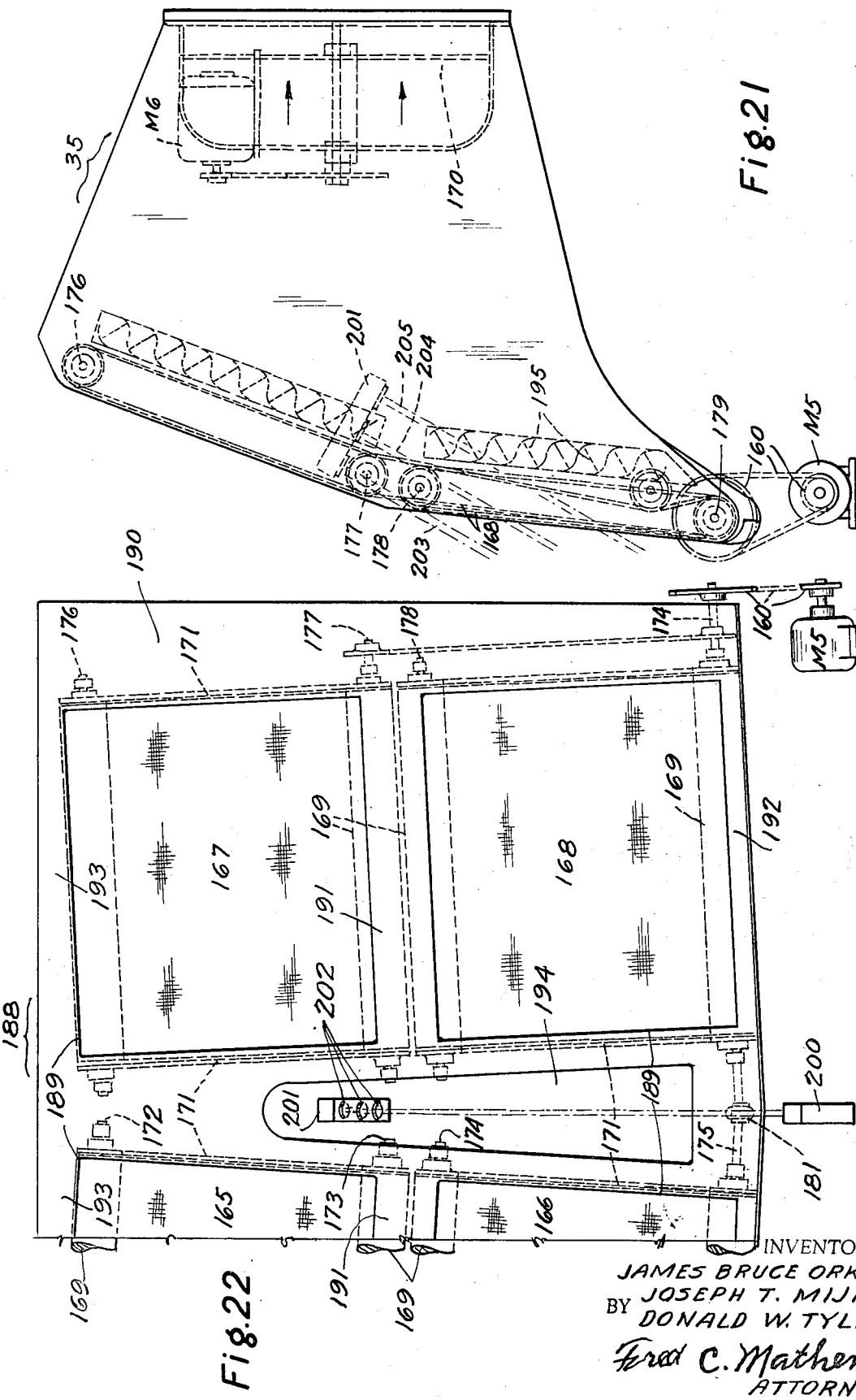

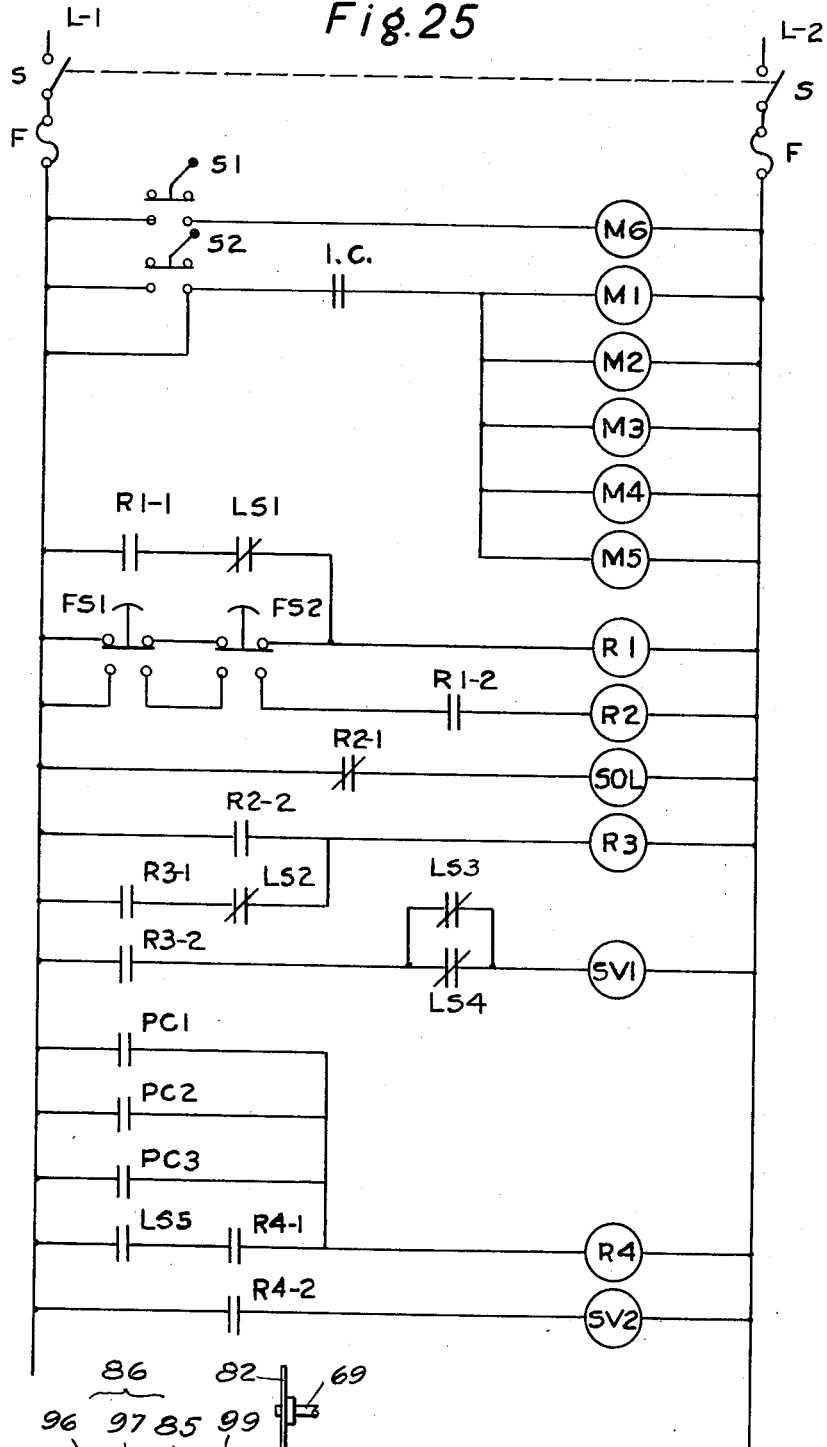
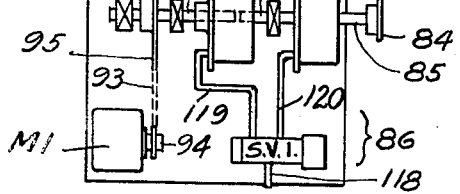

3,509,650
METHOD OF AND APPARATUS FOR FEEDING FLATWORK INTO A FLATWORK IRONER
James Bruce Orkney, Bellevue, Wash. (822 Denny Bldg., 2200 6th Ave., Seattle, Wash. 98121), Joseph T. Mijich, 1625 IBM Bldg., Seattle, Wash. 98101, and Donald W. Tyler, Seattle, Wash.; said Tyler assignor to said Orkney and said Mijich
Filed Dec. 8, 1967, Ser. No. 689,062
Int. Cl. D06f 67/04
U.S. Cl. 38—143                    4 Claims

ABSTRACT OF THE DISCLOSURE

Flatwork ironer feeding mechanism in which a wide frame in front of the ironer supports a plurality of sheet carrier cross bars for movement in a continuous path. The edges of the sheets are attached to these bars and the bars lifted and placed on conveyors which support a large number of bars each carrying a sheet of flatwork and urge them toward the ironer. The suspended sheets are successively drawn by suction against downwardly moving screens which deliver them onto the feed means of the ironer. This delivery is timed by electrical sensing means to keep the ironer operating at full capacity. The screens stretch the sheets lengthwise and crosswise to smooth them and remove wrinkles. Conveyors return the sheet carrier bars to a starting position.

BACKGROUND OF THE INVENTION

Field of the invention

In general this invention relates to a method of and apparatus for feeding sheets of pliable material and more particularly to a method of and apparatus for feeding sheets of flatwork to a flatwork ironer in a laundry.

Description of the prior art

In laundries it is common practice to feed flatwork, such as bed sheets, table cloths and the like, all of which are herein referred to as sheets, into a flatwork ironer by hand. This manual feeding of the flatwork direct to the ironer ordinarily requires a minimum of two operators and requires more than two operators if the ironer is to be operated near its full capacity. When two operators are feeding sheets directly to a flatwork ironer by hand they must stretch and smooth the sheets to a certain extent and must lay the leading edge of each sheet on the feed belts of the ironer while retaining their hold on the leading edge of the sheet until they are sure it has advanced far enough so it will be engaged by the ironer rolls and moved on through the ironer. This takes time in the feeding of each sheet and is one reason why two operators can not ordinarily feed a flatwork ironer to its full capacity.

SUMMARY OF THE INVENTION

A primary object of our invention is to provide sheet feeding apparatus which will help in straightening and smoothing and removing wrinkles from sheets and which will relieve the operators from manually guiding the sheets into the ironer and which can be fed by two operators faster than the ironer can handle the sheets so that a reserve of sheets can be maintained in the sheet feeder and if the operators stop work temporarily the sheet feeder can continue to supply sheets to the ironer at full capacity and the operators can build up the depleted reserve supply when they resume work. This makes it easier on the operators and at the same time enables them to turn out more work. The sheets are stretched and smoothed in the sheet feeder and the feeding of the sheets into the ironer is uniform and less dependent on the skill and dexterity of the operators than when they feed the sheets directly to the ironer.

Another object is to provide a method of and means for feeding sheets to a flatwork ironer in which the sheets are drawn and held by suction against downwardly moving screens or wire mesh conveyor means and are delivered by said screens or wire mesh conveyor means onto the infeed means of the ironer.

Another object is to provide a method of and apparatus for feeding sheets to a flatwork ironer in which electric sensing means responsive to the position of the trailing edge of a sheet going into the ironer and the length of the next succeeding sheet to be fed to the ironer is provided and controls the feeding of the sheets in such a manner as to prevent gaps between successive sheets and insure full capacity operation of the ironer.

Another object is to provide sheet feeding means in which a plurality of bars are supported parallel to each other for movement in a continuous path, each bar having means to receive and releasably hold an edge of a sheet, and in which means are provided to lift the bars and deliver them onto horizontal conveyors by which they are moved, in side by side relation with a sheet suspended from each bar, toward downwardly moving screens against which the sheets are drawn by suction and delivered onto the infeed means of an ironer.

Another object is to provide sheet feeding apparatus which has storage capacity for a large number of bars carrying sheets ready to be delivered to an ironer and storage capacity for a large number of bars which are being held in readiness to receive sheets. Other objects will be apparent from the following description and accompanying drawings.

BRIEF DESCRIPTION OF THE DRAWINGS

FIG. 1 is a view in side elevation of a sheet feeding machine constructed in accordance with this invention.

FIG. 2 is a fragmentary view in front elevation of the same showing the two side frames of the machine with most of the central portion thereof broken away.

FIG. 3 is a detached view in side elevation of a lift and lowering conveyor embodied in the invention.

FIG. 4 is a detached view in front elevation, with parts broken away, of said lift and lowering conveyor.

FIG. 5 is a detached fragmentary view in side elevation, with parts broken away, showing a loaded bar storage conveyor of the crowding conveyor tape.

FIG. 6 is a plan view, with parts broken away, of the loaded bar storage conveyor shown in FIG. 5.

FIG. 7 is a fragmentary detached view in side elevation of an indexing conveyor.

FIG. 8 is a plan view, with parts broken away, of the indexing conveyor shown in FIG. 7.

FIG. 9 is a fragmentary view in side elevation on a larger scale than the preceding figures showing end portions of an empty bar storage conveyor and upper end portions of the lift and lowering conveyor together with bar stop and transfer means provided between these two conveyors.

FIG. 10 is a fragmentary view, partly in elevation and partly in section, taken substantially on broken line 10—10 of FIG. 9.

FIG. 11 is a fragmentary view in side elevation showing adjoining end portions of the loaded bar storage conveyor and the indexing conveyor together with means for stopping bars on the loaded bar storage conveyor and transferring them to the indexing conveyor.

FIG. 12 is a view partly in section and partly in elevation taken substantially on broken line 12—12 of FIG. 11.

FIG. 13 is a fragmentary edge view of a sheet carrying bar showing sheet clamps extending downwardly therefrom.

FIG. 14 is a fragmentary plan view, on a larger scale than FIG. 13 and with parts in section, showing one end portion of said sheet carrying bar.

FIG. 15 is a view partly in section and partly in elevation taken substantially on broken line 15—15 of FIG. 14.

FIG. 16 is an end view looking in the direction indicated by line 16—16 of FIG. 14.

FIG. 17 is a sectional view, with parts in elevation, taken substantially on line 17—17 of FIG. 14.

FIG. 18 is a fragmentary view, partly in section and partly in plan, showing a sheet clamp operating roller in a clamp releasing position.

FIG. 19 is a somewhat diagrammatic fragmentary view illustrative of means used for closing the sheet clamps of the sheet carrying bars.

FIG. 20 is a fragmentary view, partly in section and partly in elevation, showing track means for sheet carrying bars.

FIG. 21 is a detached view in side elevation of a vacuum manifold housing which supports driven wire mesh conveyors or screens by which sheets are delivered to the feed means of an ironer.

FIG. 22 is a view in front elevation, with parts broken away, of said manifold housing showing the wire mesh screens.

FIG. 24 is a somewhat diagrammatic view of a driving assembly herein shown as applied to the lift and lowering conveyor and which is also applicable to the indexing conveyor.

FIG. 25 is a wiring diagram illustrative of the electrical control and operating devices used in connection with this sheet feeding mechanism.

Like reference numerals indicate like parts throughout the several views.

DESCRIPTION OF THE PREFERRED EMBODIMENTS

Figure 23:
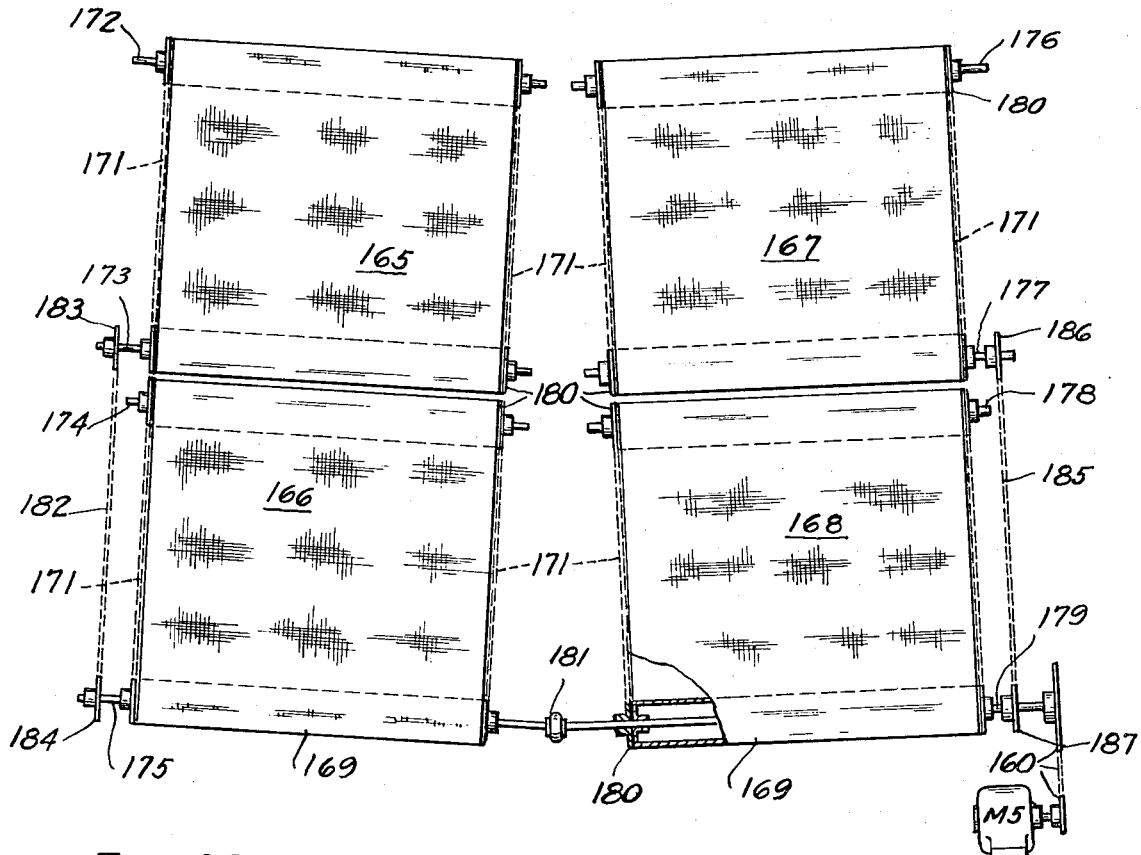
FIG. 23 is a somewhat diagrammatic view in front elevation showing some of the mounting means and some of the driving means for the screens.

The frame structure of this apparatus comprises two similar side frames 30 and 31 supported in upright, spaced apart, parallel relation and connected with each other by cross frame members 32. Preferably this frame is provided with caster type wheels 33 which rest on and can be moved over a floor 34. A sheet delivery assembly, principally comprising a manifold housing 35 is supported from the end portion of the frame shown at the right in FIG. 1 at a substantial distance above the floor 34. The two side frames 30 and 31 are spaced apart a distance greater than the width of a conventional flatwork ironer 36, a fragment of which is diagrammatically shown in FIG. 1. Said ironer comprises infeed means in the form of endless feed belts or ribbons 37 and it has the usual heated platen 38 and rolls 39 under which the flatwork being ironed passes.

When this sheet feeder is in use the frame composed of parts 30, 31, 32 is positioned in front of the ironer 36 and the sheet delivery manifold 35 overhangs the ironer infeed means 37 and forward end portion of the ironer 36.

The frame 30, 31, 32 carries suitable devices for supporting and moving a plurality of sheet carrying bars 40 from which sheets S can be suspended and delivered to the sheet delivery assembly. In this description the bars 40 are termed loaded bars when they have sheets attached to them and empty bars when no sheets are attached. In a general way the devices for supporting and moving the sheet carrying bars comprise four conveyors as follows. An upright lift and lowering conveyor 41 at the forward end of the machine is adapted to lift loaded bars 40 upwardly from and lower empty bars 40 down to a loading station indicated at A. A generally horizontal loaded bar storage conveyor 42 is positioned to receive the loaded bars 40 from the lift and lowering conveyor 41 and move them toward the manifold housing 35, said conveyor 42 being positioned high enough so that sheets hanging from bars on it will be clear of the floor. A generally horizontal indexing conveyor 43 is positioned to receive loaded bars 40 from the storage conveyor 42 and transfer the sheets from these bars to the manifold housing 35 and start the empty bars 40 back toward the lift and lowering conveyor 41. An empty bar storage conveyor 44 is positioned to receive these empty bars 40 from the indexing conveyor 43 and hold them in storage until they are returned to the lift and lowering conveyor 41.

Each conveyor 41, 42, 43 and 44 comprises two widely separated parts of duplicate construction which receive the end portions of the bars and in this description like reference numerals are applied to like parts at the two sides of the conveyors.

Bed sheets are ordinarily of greater length than width and are usually fed to an ironer with their length crosswise of the ironer. This makes it desirable to attach the lateral edges of the sheets to the bars so they hang with their lesser dimension downwardly extending as respects the bar.

The sheet carrying bars 40, FIGS. 13 to 18, are all of duplicate construction. Each bar 40 is tubular and of square cross section and is preferably formed of light weight, strong material, such as aluminum alloy. A terminal member, indicated generally by 45, and preferably formed of phenol impregnated laminated canvas, is secured to and protrudes from each end of each bar 40. Each terminal member 45 comprises a narrower flat part 46 which extends into the bar 40 and is secured to said bar by bolts 47 and a wider flat part 48 which protrudes from the end of the bar 40. The wide part 48 has two opposed edges 49 which serve as contact surfaces with which conveyor lugs engage to support and move the bar, as hereinafter described. Outwardly from the contact surfaces 49 each terminal member 45 has two opposed notches 50 within which small wheels or rollers 51, mounted on bearing pins 52, are disposed. The peripheries of the wheels 51 extend a sufficient distance beyond the planes of the surfaces of extension members 45 so said members 45 will not contact the hereinafter described track and guide parts with which the wheels engage.

Each sheet carrying bar 40 is provided with a plurality of pairs of clips each composed of a fixed member 53 and a movable member 54. These clips receive and hold the edges of the sheets S. Preferably four sets of clips 53, 54, spaced about four inches apart, are provided near each end of each bar 40 to take care of sheets of the different lengths ordinarily handled. Also preferably at least one pair of clips 53, 54 is provided midway of the length of each bar 40. The fixed member 53 of each pair of clips is rigidly attached to the exterior of the bar 40 and has a sheet engaging member 55 of high friction resilient material secured to it. The movable member 54 of each pair is pivoted to the bar 40 by pivot means 56 and extends through an opening 57 in the wall of bar 40. The outer end of each clip member 54 is curved away from the adjacent clip member 53 to facilitate insertion of a sheet between the two clip members. The end of the clip 54 within the bar 40 has a cam 58 secured to it and positioned in the path of movement of a roller 59 by which member 54 can be moved toward member 53 to grip and hold a sheet. Each roller 59 is mounted on a bearing pin 60 which is carried by a bracket 61 that is part of a clip control assembly which extends throughout the length of bar 40 and can be operated from the ends of said bar. This clip control assembly is made up of axially aligned, longitudinally spaced apart rods 62 and 63 of different lengths between adjacent ends of which the brackets 61 are interposed and to which said brackets are welded.

The rod 62, shown at the left in FIGS. 14 and 15, is guided for longitudinal movement in the adjacent terminal member 45 and extends from the outer end of that terminal member 45 to the nearest bracket 61. The shorter rods 63 connect adjacent brackets 61 of the group of clips near each end of each bar 40. Two other still longer rods, not shown, connect the bracket which operates the medially positioned pair of clips of each bar 40 with the innermost bracket 61 of the set of clips adjacent each end of the bar. The rods and brackets just described form a rigid assembly which can extend beyond either end of the bar and be longitudinally moved from either end of the bar to close clip members 54 against clip members 53 or to release clip members 54 and allow them to open.

The lift and lowering conveyor unit at each side of the machine comprises a roller chain 66 operatively disposed on an upper sprocket wheel 67 and a lower sprocket wheel 68. The two upper sprocket wheels 67 are secured on an upper cross shaft 69. The two lower sprocket wheels 68 are secured on a similar lower cross shaft 70. The end portions of each cross shaft 69 and 70 are journaled in bearings 71 which are supported by bearing mounts 72 from upright frame members 73. Track bars 74 are secured to the respective edges of the frame members 73 and the roller chains run on the bars 74. Each roller chain 66 is provided with preferably three pairs of lugs, there being a shorter lug 75 and a longer lug 76 in each pair. The two lugs 75 and 76 of each pair are spaced apart far enough to receive between them the wider parts 48 of the terminal members 45 of bars 40. The three pairs of lugs 75, 76 are spaced equal distances apart on chains 66 and conveyor driving means hereinafter described is provided for moving the conveyor chains 66 through successive cycles each equal to the distance between two sets of the lugs 75, 76. This conveyor driving means is arranged to always stop the chains 66 with one set of lugs at a loading station indicated by A on the outer side and near the lower end of the conveyor and the other two sets of lugs at holding stations indicated by C and D intermediate the two ends and on opposite sides of the conveyor. When the machine is operating normally and the chains 66 are at rest an empty bar 40 with its sheet clamps protruding outwardly and in open position will be supported at each of stations A and D and a bar 40 with a sheet attached will be supported at station C.

Track members 77 are supported from the frame members 73 in outwardly spaced relation from the edges of said frame members and the wheels 31 of the sheet carrying bars 40 run within these track members. Said track members 77 are continuous along both sides and around the lower ends of the frame members 73 and are interrupted and modified in shape adjacent the upper end of the conveyor 41 to facilitate the transfer of the bars 40 between conveyor 41 and conveyor 42 and between conveyor 41 and conveyor 44. For transferring loaded bars to conveyor 42 the track member 77 is curved toward and over the end portion of conveyor 42 and a similarly curved short track 78 is supported in spaced apart parallel relation to the curved part of track 77 to deflect upwardly moving loaded bars toward and onto conveyor 42. Also an upper end of the outer lap or run of said track 77 is curved to the right and over the adjacent end of conveyor 44 and an opposed similarly curved track 79 is supported in suitably spaced relation from the curved part of track 77 to help in guiding empty bars from conveyor 44 to conveyor 41. Preferably guard strips or plates 80 are provided close to and in front of conveyor 41 for safety reasons.

The upper cross shaft 69 of conveyor 41 carries a sprocket wheel 82, see also FIG. 24, which is driven by a link belt 83 from a smaller sprocket wheel 84 on the output shaft 85 of a driving assembly indicated in a general way by 86. Driving assembly 86, illustrated diagrammatically in FIG. 24, comprises a motor M1 connected by a link belt 93 and sprocket wheels 94 and 95 with a shaft 96. The shaft 96 extends into a clutch 97 by which it may be clutched to the output shaft 85. Said output shaft extends from the clutch 97 through brake means 99 by which it can be stopped and held against rotation. Clutch 97 and brake 99 are both pneumatically operated and both are controlled by a solenoid valve SV1, hereinafter referred to in connection with FIG. 25. Solenoid valve SV1 is connected by a conduit 118 with a source of supply of air under pressure and by conduits 119 and 120 respectively with the clutch 97 and brake means 99. When the solenoid SV1 of said solenoid valve is energized the valve will be actuated to apply the clutch 97 and release the brake 99. When it is de-energized it releases clutch 97 and applies brake 99. This provides instant starting and stopping and positive holding of the conveyor 41 by the driving assembly 86. Conventional pneumatically operated electrically controlled driving assemblies which function in the same manner as the one just described are available on the market. The driving assembly 88 of indexing conveyor 43 is similar to the one just described.

Narrow guide strips 81, shown in FIG. 20, can be secured to the track members 77 in a suitable position to be engaged by the wheels 51 of bars 40 to prevent endwise drift or displacement of said bars.

The part of the loaded bar storage conveyor 42, FIGS. 1, 5 and 6, at each side of the machine comprises a roller chain 100 operatively disposed on two horizontally spaced apart sprocket wheels 101 and 102 at the forward or intake end and the rear or discharge end respectively of said conveyor 42. The two forward sprocket wheels 101 are carried on stub shafts 103. Also the two rear sprocket wheels 102 are carried on stub shaft 104. The stub shafts 103 and 104 leave the way clear at both ends of conveyor 42 for the passage of sheets which hang suspended from the bars 40. Each forward stub shaft 103 may be rigidly attached to a bracket 105 which is supported from a horizontal frame bar 106 and the sprocket wheel 101 rotatively mounted on said stub shaft 103. Each rear stub shaft 104 is rotatively mounted in a bearing 107 which is supported by a bearing mount 108 from the frame bar 106. Each sprocket wheel 102 is rigidly secured to its stub shaft 104 for driving purposes. A longitudinally extending track member 109 is provided on the upper edge of each frame bar 106 and supports the upper lap of the roller chain 101 for movement along the bar.

The driving means for the conveyor 42 comprises a driven jack shaft 110 which extends across said conveyor 42 above the chains 100 and is connected at each end with one of the stub shafts 104 for driving purposes by a link belt 112, a smaller sprocket wheel 113 and a larger sprocket wheel 114. The jack shaft 110 is driven by a driving assembly, indicated generally by 87 and which comprises a motor M2, a link belt 115 and sprocket wheels 116 and 117.

The indexing conveyor 43 comprises two spaced apart, parallel, duplicate, roller type conveyor chains 125 supported on forward sprocket wheels 126 and rear sprocket wheels 127. Each forward sprocket wheel 126 is rotatively mounted on a stub shaft 128 carried by a bracket 129 which is supported from a frame bar 130. This leaves the space between the forward sprocket wheels 126 clear. Each rear sprocket wheel 127 is fixedly secured to a cross shaft 131 which is rotatively mounted in bearings 132. Each bearing 132 is supported by a bearing mount 133 from the frame bar 130. The shaft 131 is connected by a sprocket wheel 82', link belt 83' and sprocket wheel 84' with a driving unit 88, which is a duplicate of the previously described driving unit 86 and the motor of which is indicated by M4 in FIG. 25. Each conveyor chain 125 is provided with a plurality of outwardly protruding lugs 134 which are adapted to engage with and move the bars 40. Five equally spaced lugs 134 are shown on the chain 125 in FIG. 7 for purpose of illustration but obviously the number of these lugs may be varied. These lugs 134 pick up the bars 40 as the lugs move around the sprocket wheels 126 and move said bars 40 toward the sheet delivery manifold 35, the ends of the bars being supported on tracks 77' on which the wheels 51 run. The tracks 77' are similar to the previously described track 77.

Suitable devices, FIGS. 11 and 12, are provided for controlling the transfer of loaded bars 40 from the crowding type loaded bar storage conveyor 42 to the indexing conveyor 43. These devices make it possible for the lugs 134 of the indexing conveyor 43 to pick up the foremost loaded bar 40 on the conveyor 42 each time lugs 134 on chains 125 pass around the sprocket wheels 126. These devices are in duplicate at the two sides of the machine and each is as follows. A stop member 136 is secured to a short shaft 137 which is pivotally supported by the frame bar 106 of the conveyor 42. When in the position shown in FIG. 11 each stop member 136 is in the path of the foremost bar 40 on conveyor 42 and will stop and hold all of the loaded bars 40 on said conveyor 42 while the conveyor chains 100 continue to move under said bars. Each short shaft 137 has a lever arm 138 secured to it outwardly from the frame bar 106. A spring 139 normally holds the lever arm 138 against a stop 140. An L-shaped member 141 is adjustably secured to the lever arm 138 and will extend into the path of movement of the lugs 134 when the stop member 136 is in bar holding position. One of the lugs 134 will move around each sprocket wheel 125 at each cycle of operation of the indexing conveyor 43 and in so doing will engage with member 141, angularly move lever arm 138 and shaft 137 and retract stop members 136. This will release the foremost bar 40 which will be picked up by the lugs 134 and moved along underneath the indexing conveyor 43 with its rollers rolling on outer track members 77' until the bar and suspended sheet are stopped at the end of the cycle of conveyor 43 at a holding station B which is spaced a predetermined distance from the sheet delivery manifold 35.

A cam 142 is supported from the frame bar 130 as shown in FIG. 8 near the location of the shaft 131 and is adapted to be engaged by the outwardly protruding clip control rod 62 of each bar 40 when the bar is moved from holding station B toward sheet delivery assembly 35 and reaches a position near sprocket wheels 127. This releases the sheet S to the sheet delivery assembly 35 by releasing the clips 53, 54. After the clips of a bar 40 have been moved to sheet releasing position, as just explained, the indexing conveyor chains 125 will continue to move the then empty bar around the sprocket wheels 127 and back toward the forward end of the machine. When a bar 40 reaches the forward end of the indexing conveyor 43 it will be transferred by tracks 143 to the empty bar return and storage conveyor 44.

The empty bar storage conveyor 44, FIGS. 1 and 9, is a crowding conveyor similar to the loaded bar storage conveyor 42. It comprises two spaced apart parallel duplicate roller type conveyor chains 145, only one of which is shown, carried on forward sprocket wheels 146 and rear sprocket wheels 147. The forward sprocket wheels 146 are secured on a cross shaft 148 which is journaled in suitable bearings supported by frame bars 151. The shaft 148 is driven continuously during operation of the machine by a motor M3 which is connected with said shaft by link belt and sprocket wheel means 152. The rear sprocket wheels 147 are carried on a cross shaft 153 which is journaled in suitable bearings supported from the frame bars 151.

The conveyor chains 145 are driven continuously during operation of the machine and keep all of the bars 40 on them crowded together with the foremost bar 40 pressed against stop members 156, one of which is shown in FIGS. 9 and 10 and which are in duplicate at the two sides of the machine. Each stop member 156 is pivoted on a pin 157 which is supported from the track member 79 close to and above the upper end of the lift and lowering conveyor 41. The lower end of the stop member 156 extends into the path of movement of pins 158, one of which is carried by the shorter foremost lug 75 of each pair of lugs on the chains 66 of conveyor 41. At each cycle of movement of conveyor 41 a pair of the lugs 75, 76 will pass the stop member 156, the pin 158 of the shorter lug 75 will angularly move the stop member 156 and release a bar 40 which rests against it. The released bar 40 is received between the two lugs 75, 76 of the pair, thus completing the transfer of the bar from conveyor 44 to conveyor 41, and the stop member 156 will be returned by a suitable spring 159 to its bar stopping position in which it rests against a stop pin 161.

The moving screen vacuum type sheet delivery means by which the sheets are smoothed and fed downwardly onto the ironer infeed means 37 comprises a plurality, preferably four, endless driven wire mesh belts 165, 166, 167 and 168 herein referred to as screens. These screens are supported on rollers 169 at the forward end of the vacuum manifold housing 35. This housing 35 is approximately square in outline at its forward end and is wider than the longest sheet to be handled. Said housing 35 is preferably of convergent shape from its forward toward its rear end. A blower of conventional construction including a fan 170 driven by an electric motor M6 is provided at the rear end of the housing 35 and is capable of exerting a suction through said housing and through the four screens 165, 166, 167 and 168. This suction holds the sheets against the downwardly moving outer laps or surfaces of these four screens.

The screens 165 and 166 at one side of the medial vertical plane of the housing 35 diverge from the screens 167 and 168 at the other side of said medial vertical plane, downwardly considered. Also the screens 165 and 166 are transversely spaced a substantial distance from the screens 167 and 168 to leave room therebetween for the operation of electrical sensing means hereinafter described. Preferably each endless wire mesh screen has an endless link belt 171, shown by dash lines in FIG. 23, permanently secured to each edge thereof. The rollers 169 are freely rotatively mounted on the shafts 172 to 179 inclusive and the four screens are supported on these rollers. Sprocket wheels 180 are fixedly secured to the shafts 172 to 179 and the link belts 171 operate on these sprocket wheels.

The lowermost shaft 179 of screen 168 has a driving means comprising a motor M5 connected by suitable link belt and sprocket wheel means 160 with it. The motor M5 provides for continuous driving of shaft 179 during operating periods. The lowermost shaft 175 of screen 166 is connected by a flexible coupling 181 with the lowermost driven shaft 179 of screen 168. The lowermost shaft 173 of upper screen 165 is driven from the lowermost shaft 175 of screen 166 by a link belt 182 on sprocket wheels 183 and 184. The lowermost shaft 177 of screen 167 is driven from the lowermost shaft 179 of screen 168 by a link belt 185 operating on sprocket wheels 186 and 187. The two sprocket wheels 183 and 186 on the shafts 173 and 177 of the upper screens 165 and 167 are slightly larger than the sprocket wheels 184 and 187 from which they are driven and this drives the two lowermost screens 166 and 168 at a slightly greater lineal speed than the two uppermost screens 165 and 167 and smooths and removes wrinkles from the sheets by exerting some vertical tension on them. Divergence, downwardly considered, of screens 165 and 166 relative to screens 167 and 168 exerts some horizontal smoothing tension on the sheets.

Frame means, shown in FIG. 22, and indicated in a general way by 188 is provided on the front of the manifold housing 35. This frame means is formed of thin metal, such as thin stainless steel. It has openings 189 through which the screens are exposed. Also it has side marginal parts 190 which cover the link belts 171 and can cover the lateral margins of the several screens. Also it has medially positioned bridge parts 191 which extend across the spaces between the lower ends of the upper screens 165 and 167 and the upper ends of the lower screens 166 and 168. Also it has upper marginal parts 193 which overlie and extend partially around the upper ends of screens 165 and 167 and lower marginal parts 192 which overlie and extend partially around the lower ends of lower screens 166 and 168 where said screens pass around the rollers 169. A suitable opening 194 for electrical sensing devices, hereinafter described, is provided between screens 165 and 166 and screens 167 and 168.

The bridge parts 191 lie close to the screens where the screens are bent around the rollers and the rollers cut off suction through parts of the screens in contact therewith and the sheets pass over these bridge parts smoothly. The leading or lower edge portions of the sheets will ordinarily slightly overlap the trailing edge portions of the sheets preceding them on the screens and these leading edge portions will usually be below the bridge parts 191 at the time they are first drawn against the screens. The upper edges of the lower marginal parts 192 are below the location where the sheets are relieved of most of the suction as they pass around the lowermost rollers 169 and the leading edges of the sheets will pass over the marginal frame parts 192 and move downwardly until they contact the infeed means 37 of the ironer, after which the sheets will be drawn around these parts 192 as they are pulled into the ironer.

Preferably adjustable dampers or louvers are provided. These louvers, shown dotted in FIG. 21 and numbered 195, are within the manifold housing 35 close to and back of the several screens and can be used to vary the suction through the screens without varying the speed of the blower fan 170.

The driving assembly 88 of the indexing conveyor 43 is controlled by electric sensing means which is responsive jointly to the position of the lower edge portion of a suspended sheet at holding station B and the position of the trailing edge of a sheet being moved downwardly by the screens. This sensing means is designed to prevent gaps between successive sheets going into the ironer and preferably to feed each sheet so that its leading edge slightly overlaps the trailing edge of the next preceding sheet.

The electric sensing means shown by dash lines in FIG. 1 and shown diagrammatically in FIG. 25 comprises two housings or cell mounts 200 and 201 each having in it three spaced apart photoelectric cells 202. The housings 200 and 201 are spaced apart and positioned so that beams between paired cells therein can be maintained along paths indicated diagrammatically by line 203, 204 and 205. Obviously the number of pairs of cells in the housings 200 and 201 can be varied to provide more or less beams as desired. The housing 201 containing one group of cells is positioned within the manifold housing 35 and at least slightly back of the path along which the sheets on the screens move and in the space between the two sets of screens 165, 166 and 167, 168. The housing 200 containing the other set of cells 202 is positioned lower than the housing 201 and forwardly of the vertical plane occupied by a sheet S in the holding position at station B. The cells 202 are arranged in pairs and positioned so that the beams 203, 204 and 205 are parallel and spaced apart and intersect, at an incline, both the plane of a suspened sheet at the holding station B and the path of movement of a sheet on the screens.

When both the lower edge of the sheet S at station B and the trailing edge of the sheet on the downwardly moving screens are clear of at least one of the beams of the sensing means a circuit to the indexing conveyor motor M4 will be closed and a cycle of the indexing conveyor 43 started. This cycle will move a sheet from station B onto the screens and move another sheet to station B. Obviously the longest sheet to be handled will not obstruct the lowermost beam when the sheet is at station B. The upward incline of the beams between the plane of a sheet at station B and the screens allows time for moving the incoming sheet onto the screens so there is no gap between successive sheets.

In the electrical diagram, FIG. 25, L-1 and L-2 are power supply lines, SW a switch and F fuses. M1 is the motor which drives lift and lowering conveyor 41. M2 is the motor which drives loaded bar storage conveyor 42. M3 is the motor which drives empty bar storage conveyor 44. M4 is the motor which drives indexing conveyor 43. M5 is the motor which drives the screens and M6 is the motor which drives the blower fan 170. S1 is a switch in the circuit of motor M6 and S2 a switch common to the motor which drives loaded bar storage conveyor 42. the circuits of the motor M1 to M5 inclusive. I.C. is an interlock contact between the circuits of motors M1 to M5 inclusive and the circuit of the ironer driving means.

FS1 and FS2 are two switches, preferably of foot operated type, used by the two operators respectively who feed the machine to close circuits which control the clamping of the sheets and the operation of the lift and lowering conveyor 41, R1, R2, R3 and R4 are relays having contacts R1-1, R1-2, and R2-1, R2-2 and R3-1, R3-2 and R4-1, R4-2. LS1 is a limit switch positioned at loading station A. LS2 is a limit switch which is herein described as positioned at intermediate station C of conveyor 41. LS3 and LS4 are two limit switches positioned adjacent the bar receiving end of the loaded bar storage conveyor 42. LS5 is a limit switch herein described as positioned adjacent the holding station B of indexing conveyor 43.

SOL is a solenoid positioned near loading station A and used for closing the sheet clamps of bars 40, see FIG. 19. SV1 is the solenoid valve of the driving unit 86 of indexing conveyor 43 and PC1, PC2 and PC3 are representative of the photo-electric cell sensing means.

When switches FS1 and FS2 are in released position the circuit to R1 is closed through these switches and since R1-1 and R1-2 will also be closed this circuit is also closed through LS1 and R1-1. When a sheet is properly positioned in the clamps the depression of both switches FS1 and FS2 will close a circuit to R2 thus closing R2-1 and R2-2. The closing of R2-1 will close a circuit to solenoid SOL which will close the clamps of the bar 40 at station A and this circuit will be broken immediately by the opening of LS1 to allow the plunger 196 of SOL to retract. The closing of R2-2 will energize R3 thus closing R3-1 and R3-2. The closing of R3-2 will close and hold in the circuit to SV1 which will release the brake and apply the clutch of driving unit 86 of conveyor 41.The closing of R3-1 will hold the circuit to R3 closed through LS2 and allow the circuits of R3 through R2-2 to be opened by the opening of FS1 or FS2 or R2 without stopping the lift and lowering conveyor 41 before the end of its cycle. At the end of the cycle of conveyor 41 LS2 is opened thus breaking the circuit to R3 and opening the circuit through R3-2 to SV1 which controls the cycling of conveyor 41.

LS3 and LS4 are in the circuit of SV1 and if both of these limit switches are open at the same time the conveyor 41 can not be operated. The circuit to R4 will be closed by the operation of any one or more of the sensing devices represented in FIG. 25 by PC1, PC2 and PC3. Closing of the circuit to R4 will complete a holding circuit through normally closed limit switch LS5 and R4-1 and will close a circuit to SV2 through R4-2. The energizing of SV2 will start the cycle of the indexing conveyor 43 by releasing the brake and applying the clutch of driving unit 88. The cycle of indexing conveyor 43 will be stopped when a loaded bar 40 arrives at station B by the opening of LS5.

The operation of this sheet feeding machine may be summarized as follows: At the time of starting the machine the empty bar storage conveyor 44 will usually be loaded with empty bars 40 and there will be an empty bar at loading station A and another at station D. The closing of switches S1 and S2 will start all motors operating continuously. The operators apply the sheets, one at a time, to the empty bars 40 at loading station A. When the first sheet is properly positioned in the clamps 53, 54 of the bar at station A the two operators will depress the switches FS1 and FS2. This energizes solenoid SOL and causes its plunger 196, FIG. 19, to close the clamps 53, 54. Also it starts a cycle of operation of conveyor 41 by closing a circuit to the solenoid of solenoid valve SV1 of driving assembly 86. The plunger 196 is spring retracted and the movement of said plunger in closing the clamps 53, 54 operates LS1 and breaks the circuit to SOL and allows plunger 196 to retract. The cycling of conveyor 41 elevates the applied sheet to station C, moves the empty bar from station D to station A, moves another empty bar to station D and operates the limit switch LS2 to stop the cycle. Thereafter each succeeding cycle of conveyor 41 will repeat the steps just described and will also deliver a loaded bar from station C to the loaded bar storage conveyor 42. Conveyor 42 will keep all of the bars 40 thereon crowded against the stop member 136, FIGS. 11 and 12, at its discharge end. Limit switches LS3 and LS4 are positioned and electrically interconnected so that single bars can operate them one at a time without opening the circuit to the solenoid SV1 of the driving assembly 86 of conveyor 41 but if conveyor 42 becomes loaded to capacity both of these limit switches will be operated, the circuit to SV1 opened and delivery of any more bars to conveyor 42 prevented until it has room to receive them.

The cycle of the indexing conveyor 43 is started by the sensing means whenever the screens are in readiness to receive a sheet. When the machine is operating normally this conveyor 43, when at rest, will be holding a loaded bar 40 with a sheet S hanging therefrom at station B. In this position the sheet S may not intercept any of the beams 203, 204 and 205, or it may intercept one or both of the upper beams 203 and 204 but will not be long enough to intercept the lowermost beam 205. The upward incline of the sensing means from forward housing 200 to rear housing 201 allows suspended sheets to be moved horizontally into beam obstructing position without coming into contact with forward housing 200.

When the trailing edge of a downwardly moving sheet on the screens moves clear of a beam of the sensing means which is not obstructed by the suspended sheet at station B, the cycle of conveyor 43 will be started. During this cycle the sheet at station B will be moved against the screens, the clamps which hold it will be released by cam 142 thus releasing the sheet to the screens, another loaded bar will be transferred from conveyor 42 to conveyor 43 and moved to holding station B and the cycle will be stopped by the actuation of limit switch LS5, which can be positioned adjacent station B. Bars from which sheets are released to the screens are moved on around the indexing conveyor 43 and delivered to the empty bar storage conveyor 44 which runs continuously and preferably is long enough to hold all of the bars in use in the machine.

We claim:
1. In a conveyor mechanism for flatwork sheets and the like, comprising a perforate means engaged by the flatwork, suction means acting through the perforate means and maintaining the flatwork engaged therewith, and means for moving the perforate means to move the flatwork along a path of travel to a point of discharge; the improvement for spreading and smoothing the flatwork during conveyance thereof, which improvement comprises a plurality of endless driven perforate means divergingly arranged along the path of travel and exerting a spreading action on the flatwork laterally of the path of travel during movement thereof along the path of travel.

2. A conveyor mechanism according to claim 1, wherein said endless driven perforate means are arranged to move downwardly at an acute angle relative to horizontal.

3. A flatwork conveyor mechanism according to claim 1, comprising a plurality of divergingly related, endless driven perforate means arranged in series along the path of travel of the flatwork, with driven perforate means closer to the point of discharge of the flatwork being driven at a lineal speed faster than the lineal speed of driven perforate means more remote from the point of discharge.

4. A conveyor mechanism according to claim 3, wherein said endless driven perforate means are arranged to move downwardly at an acute angle relative to horizontal.

References Cited
UNITED STATES PATENTS

| 3,198,315 | 8/1965 | Long | 38—143 X |
| 3,231,267 | 1/1966 | Boam et al. | 38—143 X |

MERVIN STEIN, Primary Examiner

G. V. LARKIN, Assistant Examiner

U.S. Cl. X.R.

38—7; 214—1; 271—76